United States Patent
Sato et al.

(10) Patent No.: US 8,563,669 B2
(45) Date of Patent: Oct. 22, 2013

(54) OLEFIN POLYMERIZATION REACTOR, POLYOLEFIN PRODUCTION SYSTEM, AND POLYOLEFIN PRODUCTION PROCESS

(75) Inventors: Hideki Sato, Ichihara (JP); Hiroyuki Ogawa, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/428,642

(22) Filed: Mar. 23, 2012

(65) Prior Publication Data
US 2012/0245309 A1 Sep. 27, 2012

(30) Foreign Application Priority Data
Mar. 25, 2011 (JP) ................. P2011-067991

(51) Int. Cl.
| C08F 210/00 | (2006.01) |
| C08F 2/01 | (2006.01) |
| C08F 10/00 | (2006.01) |
| B01J 19/00 | (2006.01) |

(52) U.S. Cl.
USPC .............. 526/65; 526/348; 526/68; 422/134; 422/131

(58) Field of Classification Search
USPC ................ 526/65, 68, 348; 422/131, 134
See application file for complete search history.

(56) References Cited

U.S. PATENT DOCUMENTS

| 5,235,009 A | 8/1993 | Hogan |
| 6,306,981 B1 | 10/2001 | Brown et al. |
| 2009/0148354 A1 | 6/2009 | Ogawa et al. |
| 2009/0149610 A1* | 6/2009 | Sato et al. ................. 526/65 |

FOREIGN PATENT DOCUMENTS

| JP | 2000-302807 A | 10/2000 |
| JP | 2009-161734 A | 7/2003 |
| JP | 2003-277412 A | 10/2003 |
| JP | 2009-161735 A | 7/2009 |

* cited by examiner

Primary Examiner — William Cheung
(74) Attorney, Agent, or Firm — Birch, Stewart, Kolasch & Birch, LLP

(57) ABSTRACT

An olefin polymerization reactor is provided with a first cylinder extending vertically; a first tapered cylindrical member placed in the first cylinder, having the inner diameter decreasing progressively downward, and having a gas inlet orifice at a bottom end thereof; a first liquid supplying part supplying a liquid so that the liquid may come into contact with an outer surface of the first tapered cylindrical member; and a gas supplying part supplying an olefin-containing gas through the gas inlet orifice into a first reaction region surrounded by an inner surface of the first tapered cylindrical member and an inner surface of the first cylinder above the first tapered cylindrical member, to form a spouted bed in the first reaction region.

3 Claims, 4 Drawing Sheets

OLEFIN POLYMERIZATION REACTOR, POLYOLEFIN PRODUCTION SYSTEM, AND POLYOLEFIN PRODUCTION PROCESS

BACKGROUND OF THE INVENTION

1. Field of the Invention

The present invention relates to an reactor for olefin polymerization using a spouted bed and a polyolefin production system, and a process for producing polyolefin such as polyethylene or polypropylene, using them.

2. Related Background Art

A gas-phase polymerization reactor capable of forming a fluidized bed is known as an olefin polymerization reactor to polymerize olefin in the presence of a solid catalyst to obtain polyolefin particles. This reactor is provided with a single-stage gas-phase polymerization reactor consisting of one polymerization stage, a heat exchanger which cools and partly condenses an unreacted-olefin-containing gas recovered from the reactor, so as to remove heat from the interior of the reactor, and a pipe for again supplying the cooled gas and the condensate liquid to the reactor (e.g., cf. Patent Literature 1).

Another known gas-phase polymerization reactor capable of forming a fluidized bed is a multistage gas-phase polymerization reactor partitioned into two or more polymerization stages and configured to move polyolefin particles from an initial stage to a final stage and to supply an olefin-monomer-containing gas from the final stage to the initial stage (e.g., cf. Patent Literatures 2 and 3). An ordinary known device for removal of heat in the multistage gas-phase polymerization reactor is a device with a heat exchanger to lower the temperature of the unreacted-olefin-containing gas recovered from the initial stage of the polymerization reactor, and a pipe to supply the temperature-lowered gas again to the final stage of the polymerization reactor.

Furthermore, the known reactor for olefin polymerization reaction also include reactors for olefin polymerization using a spouted bed (e.g., cf. Patent Literatures 4 and 5) and a known device for removal of heat in the spouted-bed-type olefin polymerization reactors is a device configured to introduce a liquid monomer into a reaction region and remove heat by making use of its evaporation latent heat.

CITATION LIST

Patent Literatures

Patent Literature 1: Japanese Patent Application Laid-open No. 2000-302807
Patent Literature 2: U.S. Pat. No. 5,235,009
Patent Literature 3: Japanese Patent Application Laid-open No. 2003-277412
Patent Literature 4: Japanese Patent Application Laid-open No. 2009-161735
Patent Literature 5: Japanese Patent Application Laid-open No. 2009-161734

SUMMARY OF THE INVENTION

Figure 1:
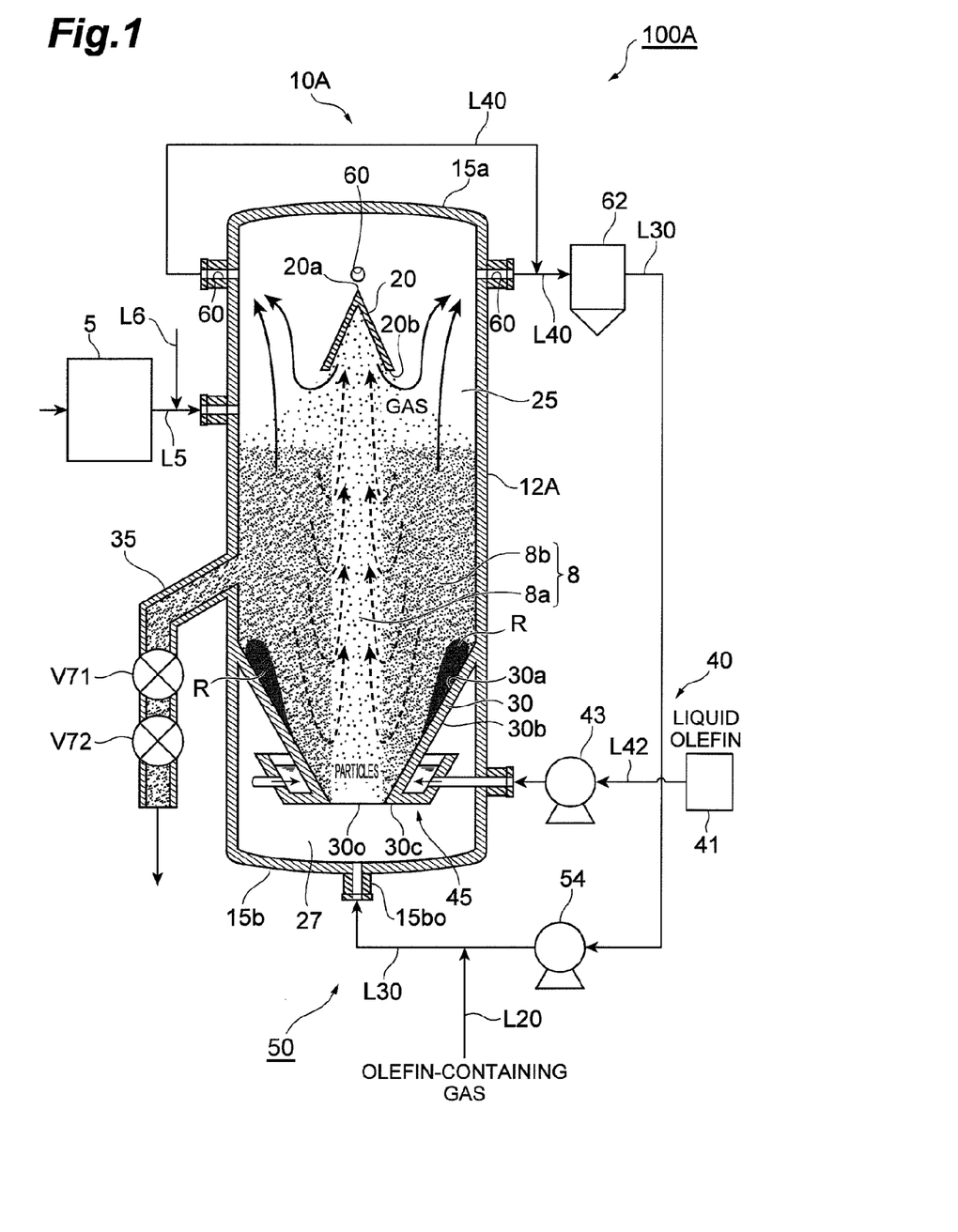
FIG. 1 is a schematic configuration diagram showing an embodiment of the olefin polymerization reactor according to the present invention.

The inventors conducted further research and improvement of the reactor described in Patent Literatures 4 and 5 above, and discovered an reactor adaptable to a scale-up of the reactors of Patent Literatures 4, 5, to various polymerization conditions applied to the olefin polymerization using the reactors, and to various operation conditions of the reactors, and capable of more efficiently performing the removal of heat in the reactor even if particles are retained for a relatively long period in a region located in a bottom part of the spouted bed and away from a gas inlet orifice (e.g., region R in FIG. 1).

It is an object of the present invention to provide a spouted-bed-type olefin polymerization reactor, a polyolefin production system, and a polyolefin production process capable of achieving a higher heat removal efficiency.

A spouted-bed-type olefin polymerization reactor according to the present invention comprises: a first cylinder which extends vertically; a first tapered cylindrical member which is formed in the first cylinder, which decreases in inner diameter progressively downward, and which has a gas inlet orifice at a bottom end thereof; a first liquid supplying part which supplies a liquid so that the liquid may come into contact with an outer surface of the first tapered cylindrical member; and a gas supplying part which supplies an olefin-containing gas through the gas inlet orifice into a first reaction region surrounded by an inner surface of the first tapered cylindrical member and an inner surface of the first cylinder above the first tapered cylindrical member, to form a spouted bed in the first reaction region. The supplied liquid evaporates to cool the tapered cylindrical member.

In the foregoing reactor, the liquid supplied from the outside evaporates on the outer surface of the tapered cylindrical member to efficiently cool the tapered cylindrical member, thereby achieving a sufficiently high heat removal efficiency. Since a temperature rise is suppressed at the tapered cylindrical member, excessive progress of polymerization reaction is adequately prevented even with a low transfer rate of particles moving on the inner surface of the tapered cylindrical member; resulting polyolefin particles are improved in homogeneity and trouble such as adhesion of polyolefin to the inner surface of the tapered cylindrical member is sufficiently suppressed.

When the outer surface of the first tapered cylindrical member is interconnected with the gas inlet orifice of the first tapered cylindrical member, the liquid is preferably a liquid olefin.

The olefin polymerization reactor of the present invention preferably has a plurality of aforementioned reaction regions and is preferably configured so that polyolefin particles successively pass through the reaction regions. The reactor of the present invention preferably further comprises: a second cylinder extending vertically; a second tapered cylindrical member which is placed in the second cylinder, which decreases in inner diameter progressively downward, and which has a gas inlet orifice at a bottom end thereof; a second liquid supplying part which supplies a liquid so that the liquid may come into contact with an outer surface of the second tapered cylindrical member; and an interconnection structure which supplies the gas discharged from the first cylinder, through the gas inlet orifice of the second tapered cylindrical member into a second reaction region surrounded by an inner surface of the second tapered cylindrical member and an inner surface of the second cylinder above the second tapered cylindrical member. The reactor preferably comprises a transfer device to transfer polyolefin particles from the second reaction region to the first reaction region.

The plurality of reaction regions each may be formed so as to be arranged in the vertical direction or may be formed so as to be arranged in the horizontal direction. When the plurality of reaction regions are formed so as to be arranged in the vertical direction, the polyolefin particles may successively pass from the upper reaction region to the lower reaction region in the vertical direction, or the polyolefin particles may successively pass from the lower reaction region to the upper reaction region in the vertical direction. From the viewpoint of space saving of the reactor, a more preferred configuration is such that the plurality of reaction regions each are formed so as to be arranged in the vertical direction and the polyolefin particles successively pass from the upper reaction region to the lower reaction region. When there are a plurality of reaction regions provided to make multiple stages of spouted beds, a residence time distribution of particles can be made sufficiently narrow. Since the spouted beds, unlike the fluidized beds, induce mixing rather closer to plug flow, equivalent narrowing of the residence time distribution can be achieved by a smaller number of stages than in the case using multiple stages of fluidized beds.

A polyolefin production process according to the present invention is a polyolefin production process for performing polymerization of olefin using the aforementioned spouted-bed-type olefin polymerization reactor, which comprises: a step of forming a spouted bed of polyolefin particles in the reaction region; and a step of supplying a liquid so that the liquid may come into contact with the outer surface of the tapered cylindrical member.

The above process comprises evaporating the liquid supplied from the outside, on the outer surface of the tapered cylindrical member to highly cool the tapered cylindrical member, thereby achieving a sufficiently high heat removal efficiency. Since a temperature rise is suppressed at the tapered cylindrical member, excessive progress of polymerization reaction is adequately prevented even with a low transfer rate of particles moving on the inner surface of the tapered cylindrical member; therefore, the resulting polyolefin particles are improved in homogeneity.

A polyolefin production system according to the present invention comprises: an olefin prepolymerization reactor which performs polymerization of olefin in the presence of an olefin polymerization catalyst to form polyolefin particles; and the aforementioned spouted-bed-type olefin polymerization reactor connected as a subsequent stage to the olefin prepolymerization reactor.

A polyolefin production process according to the present invention may be one which performs multistage polymerization of olefin using the aforementioned polyolefin production system.

The present invention achieves the higher heat removal efficiency.

DESCRIPTION OF THE EMBODIMENTS

The preferred embodiments of the present invention will be described below in detail with reference to the drawings as needed. It is noted that positional relations such as vertical and horizontal relations are based on positional relations shown in the drawings unless otherwise noted in particular. Furthermore, dimensional ratios in the drawings are not limited to the illustrated ratios.

First Embodiment

Polyolefin Production System

FIG. 1 shows a polyolefin production system 100A according to the first embodiment. This production system 100A is provided with an olefin prepolymerization reactor 5 and a spouted-bed-type olefin polymerization reactor 10A which is connected as a subsequent stage to the olefin prepolymerization reactor 5.

(Olefin Prepolymerization Reactor)

The olefin prepolymerization reactor 5 is configured to polymerize olefin in the presence of an olefin polymerization catalyst to form polyolefin particles.

There are no particular restrictions on the olefin prepolymerization reactor 5, but examples of reactors include slurry polymerization reactors, bulk polymerization reactors, stirred-tank-type gas-phase polymerization reactors, and fluidized-bed-type gas-phase polymerization reactors. Any one of these reactors may be used singly, or a plurality of reactors of the same type may be used in combination, or two or more reactors of different types may be used in combination.

Examples of the slurry polymerization reactors applicable herein include well-known polymerization reactors such as the stirred-tank-type reactors and loop-type reactors as described in Japanese Patent Publication Nos. S41-12916, S46-11670, and S47-42379. Slurry polymerization is a process in which a polymerization solvent is prepared by adding an olefin monomer such as propylene or butene to an inert solvent such as an aliphatic hydrocarbon (e.g., propane, butane, isobutane, pentane, hexane, heptane, or octane) or an alicyclic hydrocarbon (e.g., cyclopentane or cyclohexane), an olefin polymerization catalyst is dispersed in the polymerization solvent so as to form a slurry, and polymerization is carried out in a state in which a polymer product is kept from dissolving in the polymerization solvent. The polymerization is carried out at such temperature and pressure as to maintain the polymerization solvent in a liquid state and to keep the polymer product from dissolving in the polymerization solvent. The polymerization temperature is generally in the range of 30 to 100° C. and preferably in the range of 50 to 80° C. The polymerization pressure is generally in the range of atmospheric pressure to 10 MPaG and preferably in the range of 0.3 to 5 MPaG.

Examples of the bulk polymerization reactors applicable herein include well-known polymerization reactors such as the stirred-tank-type reactors and loop-type reactors as described in Japanese Patent Publication Nos. S41-12916, S 46-11670, and S47-42379. Bulk polymerization is a process in which an olefin monomer such as propylene or butene is used as a polymerization solvent substantially in the absence of any inert solvent such as an aliphatic hydrocarbon (e.g., propane, butane, isobutane, pentane, hexane, heptane, or octane) or an alicyclic hydrocarbon (e.g., cyclopentane or cyclohexane), an olefin polymerization catalyst is dispersed in the polymerization solvent, and polymerization is carried out in a state in which the polymer product is kept from dissolving in the polymerization solvent. The polymerization is carried out at such temperature and pressure as to maintain the polymerization solvent in a liquid state and to keep the polymer product from dissolving in the polymerization solvent. The polymerization temperature is generally in the range of 30 to 100° C. and preferably in the range of 50 to 80°

C. The polymerization pressure is generally in the range of atmospheric pressure to 10 MPaG and preferably in the range of 0.5 to 5 MPaG.

Examples of the stirred-tank-type gas-phase polymerization reactors applicable herein include well-known polymerization reactors such as the reactors as described in Japanese Patent Application Laid-open No. S46-31969 and Japanese Patent Publication No. S59-21321. Stirred-tank-type gas-phase polymerization is a process in which a monomer in a gaseous state is used as a medium and, while maintaining an olefin polymerization catalyst and olefin polymer in a fluidized state in the medium by means of an agitator, the monomer in the gaseous state is polymerized. The polymerization temperature is generally in the range of 50 to 110° C. and preferably in the range of 60 to 100° C. The polymerization pressure can be set in the range where the olefin can exist in the vapor phase in the stirred-tank-type gas-phase polymerization reactor, and is generally in the range of atmospheric pressure to 5 MPaG and preferably in the range of 0.5 to 3 MPaG.

Examples of the fluidized-bed-type gas-phase polymerization reactors applicable herein include well-known reactors such as the reactors as described in Japanese Patent Application Laid-open Nos. S58-201802, S59-126406, and H2-233708. Fluidized-bed-type gas-phase polymerization is a process in which a monomer in a gaseous state is used as a medium and, while maintaining an olefin polymerization catalyst and olefin polymer in a fluidized state in the medium mainly by flow of the medium, the monomer in the gaseous state is polymerized. In some cases, an agitator is provided as an auxiliary device to promote fluidization. The polymerization temperature is generally in the range of 0 to 120° C., preferably in the range of 20 to 100° C., and more preferably in the range of 40 to 100° C. The polymerization pressure can be set in the range where the olefin can exist in the vapor phase in the fluidized-bed-type reactor, and is generally in the range of atmospheric pressure to 10 MPaG preferably in the range of 0.2 to 8 MPaG and more preferably in the range of 0.5 to 5 MPaG.

Examples of the combinations of different reactors include configurations wherein a fluidized-bed-type gas-phase polymerization reactor or a stirred-tank-type gas-phase polymerization reactor is connected as a subsequent stage to a slurry polymerization reactor or a bulk polymerization reactor.

Furthermore, a flushing tank for separating olefin polymer particles from unreacted olefin and the polymerization solvent is generally located between a slurry polymerization reactor or a bulk polymerization reactor and a gas-phase polymerization reactor, e.g., such as a fluidized-bed-type gas-phase polymerization reactor, a stirred-tank-type gas-phase polymerization reactor, or the below-described olefin polymerization reactor 10A. The gas-phase polymerization reactor is connected as a subsequent stage to the slurry polymerization reactor or the bulk polymerization reactor. It should be, however, noted that installation of the flushing tank is not always essential between the bulk polymerization reactor and the gas-phase polymerization reactor subsequent thereto.

(Spouted-Bed-Type Olefin Polymerization Reactor)

The olefin polymerization reactor 10A is a reactor that subjects polyolefin particles produced by the olefin prepolymerization reactor 5 to the olefin polymerization reaction substantially in the gas phase.

The olefin polymerization reactor 10A shown in FIG. 1 is configured so as to form a single-stage spouted bed 8 and is provided mainly with a cylinder (first cylinder) 12A extending vertically, closer plates 15a, 15b closing the top end and the bottom end, respectively, of the cylinder 12A, a deflector 20 placed in the cylinder 12A, and a tubular baffle (first tapered cylindrical member) 30 disposed in the cylinder 12A. The deflector 20 and the tubular baffle 30 each are preferably arranged coaxially with the axis of the cylinder 12A. From the viewpoint of stabilization of the spouted bed, the inner diameter of the cylinder 12A is preferably not more than 5 m and more preferably not more than 3.5 m. In the olefin polymerization reactor 10A, a reaction region (first reaction region) 25 is formed by the bottom surface of the closer plate 15a, the part located above the tubular baffle 30, in the inner surface of the cylinder 12A, and the inner surface 30a of the tubular baffle 30. On the other hand, a lower region 27 is formed by the top surface of the closer plate 15b, the part located below the tubular baffle 30, in the inner surface of the cylinder 12A, and the outer surface 30b of the tubular baffle 30.

In the reaction region 25, an olefin-containing gas supplied into the lower region 27 quickly flows upward through a gas inlet orifice 30o provided at a bottom end 30c of the tubular baffle 30, thereby forming the spouted bed 8 of polyolefin particles, as shown in FIG. 1. The spouted bed 8 is composed of a spouted section 8a and an annular particle layer 8b.

In the present embodiment, a gas supplying part 50 is composed of the portion forming the lower region 27, a line L30 connected to the lower region 27, a compressor 54 connected to the line L30, and a line L20 connected to the circulation line L30 to replenish the olefin.

The tubular baffle 30 is such a tapered cylinder that the inner diameter thereof decreases progressively downward, and is placed in the cylinder 12A. The gas inlet orifice 30o formed at the bottom end 30c of the tubular baffle 30 may be provided with a check valve (not shown) to prevent the polyolefin particles in the reaction region 25 from flowing out downward through the gas inlet orifice, for example, at a start or a temporary halt of the olefin polymerization reactor 10A.

While the spouted bed 8 is established in the reaction region 25 to make solid-gas contact between polyolefin particles and olefin, the polymerization reaction proceeds to generate heat. According to Inventors' research, the amount of influent gas tends to become smaller in the region R located away from the gas inlet orifice and in the bottom part of the spouted bed 8, and the particles are less likely to move depending upon conditions. If the particles are retained in the region R for a relatively long period to be excessively subjected to polymerization reaction, the temperature in the region R can become higher than in the other regions.

The olefin polymerization reactor 10A is provided with a device (first liquid supplying part) 40 which supplies a liquid olefin from outside to inside of the cylinder 12A so that the olefin comes into contact with the outer surface 30b of the tubular baffle 30. In the present embodiment, the liquid olefin supplying device 40 is composed of a tank 41 storing the liquid olefin, a transfer line L42 to transfer the liquid olefin in the tank 41 to the interior of the lower region 27, a pump 43 provided in the middle of the transfer line L42, and a liquid olefin reservoir 45 provided so as to surround the bottom end 30c of the tubular baffle 30. The liquid olefin supplied through the transfer line L42 evaporates in the liquid olefin reservoir 45 to draw heat from the tubular baffle 30 and cold olefin gas comes into contact with the outer surface 30b of the tubular baffle 30, at the position corresponding to the region R, so as to prevent an excessive rise of temperature in the region R.

The liquid olefin supplying device having the aforementioned configuration was exemplified herein, but the liquid olefin supplying device is not limited to it as long as the liquid olefin supplying device is configured to supply the liquid olefin so that the liquid olefin can come into contact with the outer surface 30b of the tubular baffle 30. For example, the tubular baffle 30 may be configured in such a jacket structure as to supply the liquid olefin from an opening in the upper part and/or in the lower part, or may be configured so as to blow or spray the liquid olefin toward the outer surface 30b. In the case where the liquid olefin is blown or sprayed toward the outer surface 30b of the tubular baffle 30, it is preferable to use a ring sparger, in terms of sufficiently cooling the whole of the tubular baffle 30.

Since the reactor of the present embodiment has the structure in which the outer surface 30b of the tubular baffle (first tapered cylindrical member) 30 is interconnected with the gas inlet orifice 30o of the tubular baffle (first tapered cylindrical member) 30, i.e., the structure in which the olefin gas evaporating on the outer surface 30b is supplied through the gas inlet orifice 30o into the first reaction region 25, the liquid to be brought into contact with the outer surface of the tubular baffle 30 is preferably the liquid olefin. The evaporated olefin can be a raw material of the polymerization in the first reaction region 25. The liquid olefin can be the same kind of olefin as or a different kind of olefin from that supplied to the reactor through the line L20. It is also possible to use a liquid except for the liquid olefin; for example, cycloolefins such as cyclobutene, cyclopentene, and cyclohexene, parafin hydrocarbons such as propane, butane, and hexane, aromatic hydrocarbons such as toluene and xylene, and mixed liquids of such hydrocarbons with olefins can also be used. When the liquid except for the liquid olefin is used, this reactor preferably has a structure in which the outer surface of the tubular baffle (first tapered cylindrical member) 30 is not interconnected with the gas inlet orifice 30o of the tubular baffle (first tapered cylindrical member) 30, i.e., a structure in which the evaporating gas is not supplied through the gas inlet orifice 30o into the first reaction region 25.

The deflector 20 is disposed at a position above the tubular baffle 30 in the reaction region 25 and opposite to the gas inlet orifice thereof. The deflector 20 serves to prevent scattering of spouted polyolefin particles. This can shorten a free-board zone, thereby achieving a high volume efficiency.

The deflector 20 has a conical shape closed at a top end 20a and having the inner diameter increasing progressively downward, and a bottom end 20b thereof is located apart from the inside wall of the cylinder 12A. In this configuration, particles spouted upward come to collide with the inner surface of the deflector 20 and then return into the annular particle layer 8b of the spouted bed 8. On the other hand, the gas flows below the bottom end 20b to be discharged from gas discharge nozzles 60.

The gas discharge nozzles 60 are formed in the cylinder 12A forming a side wall surface of the reaction region 25, so as to allow the gas inside the reaction region 25 to be discharged therefrom. In the olefin polymerization reactor 10A of the present embodiment, four gas discharge nozzles 60 are formed at substantially equal intervals along the circumferential direction of the cylinder 12A. When the upward influent gas through the gas inlet orifice of the tubular baffle 30 is discharged sideways from the four gas discharge nozzles 60, rather than directly from the top of the reaction region 25, the amount of gas diffusing into the annular particle layer 8b of the spouted bed 8 can be increased. As a result, the solid-gas contact efficiency between the particles and the olefin-containing gas is increased in the annular particle layer 8b of the spouted bed 8. The gas discharge nozzles 60 are located preferably above the bottom end 20b of the deflector 20 in the reaction region 25 and more preferably above the top end 20a of the deflector 20. When the gas discharge nozzles 60 are set at the height as defined, it is feasible to sufficiently decrease amount of the particles discharged together with the gas through the gas discharge nozzles 60.

The above showed the example in which there were the four gas discharge nozzles 60 installed, but the number of gas discharge nozzles 60 does not have to be limited to four. The number of gas discharge nozzles 60 to be installed may be more than or less than four, but, in order to ensure more uniform gas discharge, it is preferable to install at least two gas discharge nozzles. Furthermore, as long as a sufficient solid-gas contact efficiency is ensured in the reaction region 25, the reactor can be constructed with one gas discharge nozzle 60 installed in the central part of the closer plate 15a.

To form the stable spouted bed 8 in the reaction region 25, the tubular baffle 30 preferably satisfies the following conditions. Namely, a ratio $(d_A/d_B)$ of the diameter $d_A$ of the gas inlet orifice at the bottom end 30c of the tubular baffle 30 to the inner diameter $d_B$ of the cylinder 12A is preferably not more than 0.35.

Furthermore, an angle of inclination of the tubular baffle 30 in FIG. 1, i.e., an angle between the inner surface 30a of the tubular baffle 30 and a horizontal plane, is preferably at least the repose angle of polyolefin particles present in the cylinder 12A, and it is more preferably at least the repose angle and at least an angle at which the whole of polyolefin particles can be naturally discharged by gravity. This configuration achieves smooth downward movement of the polyolefin particles.

Although the spouted bed can also be formed using a flat plate with a gas inlet orifice therein, instead of the tubular baffle 30, the flat plate may makes a non-fluidized region of particles near the inner surface of the cylinder 12A on this flat plate. This can result in melting and agglomeration of the particles because of insufficient heat removal in this region. To avoid this situation, therefore, the tubular baffle 30 preferably has the angle of inclination of not less than the predetermined angle, as described above.

An angle of inclination of the deflector 20 in FIG. 1, i.e., an angle between the outer surface of the deflector 20 and a horizontal plane, is also at least the repose angle of the polyolefin particles present in the cylinder 12A. This can adequately prevent the polyolefin particles from sticking to the deflector 20.

The repose angle of the polyolefin particles is, for example, from about 35 to about 50°, and thus the angles of inclination of the tubular baffle 30 and the deflector 20 are preferably at least 55°.

The deflector 20 and tubular baffle 30 each are fixed to the cylinder 12A by respective supports not shown, and the supports cause substantially no influence on the gas flow and polyolefin flow. The cylinder 12A, deflector 20, and tubular baffle 30 may be made of, for example, carbon steel, SUS 304, or SUS 316L. SUS is the standard for stainless steels defined in JIS (Japanese Industrial Standards). When the catalyst employed is one containing a large amount of a corrosive ingredient (e.g., a halogen ingredient such as chlorine), it is preferable to use SUS 316L.

As shown in FIG. 1, the line L30 for supply of the olefin-containing gas is connected to the gas inlet orifice 15bo in the closer plate 15b of the cylinder 12A, and the olefin-containing gas is supplied through the lower region 27 into the reaction region 25 by the compressor 54 installed in the middle of the line. In addition to the gas inlet orifice, a discharge nozzle (not shown) which allows the polyolefin particles to be discharged at an end of operation may also be provided in the lower part of the cylinder 12A. Furthermore, in order to reduce an amount of powder remaining inside the cylinder 12A at an end of operation, an interior member of an inverted cone shape (not shown) may be installed at a position where the member does not interfere with the gas flow in the lower part of the cylinder 12A.

Gas discharge lines L40 connected to the respective gas discharge nozzles 60 for discharge of gas from the reaction region 25 are provided in the upper part of the cylinder 12A. The gas discharged through the lines L40 is guided to a cyclone separator 62 installed when needed, where gas-entrained particles are removed. After the separated gas is guided through a cooling means (not shown) or the like, the gas is recycled through the line L30. The line L20 for supply of the olefin-containing gas from the exterior to the line L30 is connected to the line L30.

In addition, a line L5 is connected to the cylinder 12A at a position higher than the region where the spouted bed 8 is formed, and the polyolefin particles containing the olefin polymerization catalyst solid particles are fed into the reaction region 25. On the other hand, a particle discharge tube 35 is connected to the cylinder 12A, and the polyolefin particles grown in the reaction region 25 are discharged through the particle discharge tube 35. Two valves V71, V72 are installed in series in the particle discharge tube 35, and the polyolefin particles can be discharged to the subsequent process by successively opening and closing the valves.

As described above, the present embodiment substantializes the polymerization process using the two reactors, namely, the olefin prepolymerization reactor 5 and the olefin polymerization reactor 10A. In this way, the olefin prepolymerization reactor 5 is used to polymerize and grow polyolefin particles as relatively large polyolefin particles having the particle size of preferably at least 500 µm, more preferably at least 700 µm, and even more preferably at least 850 µm, whereby the spouted bed can be established in a stabler state. However, it is also possible to arrange the polymerization process using a single reactor without the olefin prepolymerization reactor 5. In this case, the olefin polymerization catalyst or prepolymerization catalyst is fed directly into the olefin polymerization reactor 10A, to induce polymerization of olefin. Furthermore, it is also possible to realize the polymerization process consisting of three or more stages, by providing one or more additional olefin polymerization reactors, such as the olefin prepolymerization reactor 5 or the olefin polymerization reactor 10A, subsequent to the olefin polymerization reactor 10A.

(Olefin, Polyolefin, and Catalyst)

Next, the olefin, polyolefin, catalyst, and others in the production system 100A according to the present embodiment will be described in detail.

In the olefin polymerization reactor, polyolefin production process, and polyolefin production system according to the present embodiment, olefin is subjected to polymerization (homopolymerization or copolymerization) to produce polyolefin, i.e., olefin polymer (olefin homopolymer or olefin copolymer). Examples of the olefin to be used in the present embodiment include ethylene, propylene, 1-butene, 1-pentene, 4-methyl-1-pentene, 5-methyl-1-hexene, 1-hexene, 1-heptene, and 1-octene.

One or more of these olefins may be used. Furthermore, the olefin used may be changed in each polymerization step. In cases where the polymerization is carried out as a multistage process, different olefins may be used in respective stages. When two or more olefins are used, examples of olefin combinations to be employed include propylene/ethylene, propylene/1-butene, propylene/ethylene/1-butene, ethylene/1-butene, ethylene/1-hexene, and ethylene/1-octene. In addition to the olefin, another copolymer ingredient such as diene may be used in combination.

In the present invention, the olefin polymer (homopolymer or copolymer) may be advantageously produced, e.g., a propylene homopolymer, a propylene.ethylene copolymer, a propylene-1-butene copolymer, and a propylene.ethylene-1-butene copolymer. Particularly, the present invention is suitably applied to production of an olefin-based polymer obtained by multistage polymerization with different compositions of monomers in respective stages; for example, it is possible to form a multistage-polymerized olefin-based copolymer in such a manner that one type of olefin is supplied to the olefin prepolymerization reactor 5 and the olefin polymerization reactor 10A so as to form homopolymer particles, or random copolymer particles through copolymerization of the olefin with a small amount of another type of olefin, and that two or more types of olefins are further supplied to these polymer particles in an additional olefin polymerization reactor of a subsequent stage such as the olefin prepolymerization reactor 5 or the olefin polymerization reactor 10A. Since this process has a narrow residence time distribution in the olefin polymerization reactor 10A, it is easy to keep compositional ratios constant in the polymer particles and it is especially effective for reduction in failure during molding.

Examples of the polymer include propylene-propylene-.ethylene polymers, propylene-propylene.ethylene-propylene.ethylene polymers, propylene.ethylene-propylene.ethylene polymers, and propylene-propylene.ethylene-1-butene polymers. It is noted herein that "-" indicates a boundary between polymers and "." indicates copolymerization of two or more types of olefins in the polymer. Among these, the present invention is suitably applied to production of a multistage-polymerized propylene-based copolymer with crystalline propylene-based polymer segments and amorphous propylene-based polymer segments, which is a polymer having propylene-based monomer units and which is called "high-impact polypropylene" (which is also conventionally called "polypropylene block copolymer" in Japan). The multistage-polymerized propylene-based copolymer is one which is obtained by continuous multistage polymerization in any order of crystalline homopolypropylene segments or random copolymer segments resulting from copolymerization of propylene with a small amount of an olefin other than propylene, and amorphous rubber segments resulting from copolymerization of ethylene, propylene, and an optional ingredient of an olefin other than ethylene and propylene, in the presence of respective polymers, and which has the intrinsic viscosity measured in 1,2,3,4-tetrahydronaphthalene at 135° C., preferably in the range of 0.1 to 100 dl/g. This multistage-polymerized polypropylene-based copolymer has excellent heat resistance, rigidity, and impact resistance, and therefore can be used in automotive components such as bumpers and door trims, and in various packaging containers such as retort pouches.

In the present embodiment, the olefin polymer components produced in respective polymerization steps may be given different molecular weights, in order to broaden a molecular weight distribution of the olefin polymer. The present invention is also suitably applied to production of an olefin polymer with a broad molecular weight distribution. For example, the present invention can advantageously produce an olefin polymer in which a polymer component obtained in a polymerization step of producing the highest molecular weight polymer component has the intrinsic viscosity obtained by the aforementioned measurement, preferably in the range of 0.5 to 100 dl/g, more preferably in the range of 1 to 50 dl/g, and even more preferably in the range of 2 to 20 dl/g, this intrinsic viscosity is at least five times the intrinsic viscosity of a polymer component obtained in a polymerization step of producing the lowest molecular weight polymer component, and the amount of the polymer component obtained in the polymerization step of producing the highest molecular weight polymer component is in the range of 0.1 to 80% by weight of the olefin polymer.

The olefin polymerization catalyst used in the present embodiment may be a well-known addition polymerization catalyst used in olefin polymerization, and examples thereof include Ziegler type solid catalysts prepared by contact of a solid catalyst component containing titanium, magnesium, a halogen and an electron donor (which will be referred to hereinafter as catalyst component (A)) with an organoaluminum compound component and an electron donor component; and metallocene-type solid catalysts prepared by making a metallocene compound and a cocatalyst component supported on a granular carrier. These catalysts may also be used in combination.

The catalyst component (A) employed in the preparation of the Ziegler type solid catalysts may be a catalyst commonly called a titanium-magnesium composite catalyst. This composite catalyst may be obtained by contact of a titanium compound, a magnesium compound, and an electron donor as described below.

The titanium compound used in the preparation of the catalyst component (A) can be one of titanium compounds represented by $Ti(OR^1)_a X_{4-a}$ where $R^1$ is a hydrocarbon group of 1 to 20 carbons, X is a halogen atom, and "a" is a number satisfying $0 \le a \le 4$. Specific examples of such titanium compounds include tetrahalogenated titanium compounds such as titanium tetrachloride; trihalogenated alkoxytitanium compounds such as ethoxytitanium trichloride and butoxytitanium trichloride; dihalogenated dialkoxytitanium compounds such as diethoxytitanium dichloride and dibutoxytitanium dichloride; monohalogenated trialkoxytitanium compounds such as triethoxytitanium chloride and tributoxytitanium chloride; and tetraalkoxytitanium compounds such as tetraethoxytitanium and tetrabutoxytitanium. These titanium compounds may be used singly or in combination of two or more thereof.

Examples of the magnesium compound used in the preparation of the catalyst component (A) include magnesium compounds which have a magnesium-carbon bond or a magnesium-hydrogen bond and which have a reducing ability, and magnesium compounds which have no reducing ability. Specific examples of the magnesium compounds having the reducing ability include dialkylmagnesium compounds such as dimethylmagnesium, diethylmagnesium, dibutylmagnesium, and butylethylmagnesium; alkylmagnesium halides such as butylmagnesium chloride; alkylalkoxymagnesium compounds such as butylethoxymagnesium; and alkylmagnesium hydrides such as butylmagnesium hydride. These magnesium compounds with the reducing ability may also be used in the form of a complex compound with an organoaluminum compound.

Specific examples of the magnesium compounds without the reducing ability include dihalogenated magnesium compounds such as magnesium dichloride; alkoxymagnesium halides such as methoxymagnesium chloride, ethoxymagnesium chloride, and butoxymagnesium chloride; dialkoxymagnesium compounds such as diethoxymagnesium and dibutoxymagnesium; and magnesium carboxylates such as magnesium laurate and magnesium stearate. These magnesium compounds without the reducing ability may be compounds which are synthesized either in advance or in the preparation of the catalyst component (A), by a known method from the magnesium compounds with the reducing ability.

Examples of the electron donor used in the preparation of the catalyst component (A) include oxygen-containing electron donors such as alcohols, phenols, ketones, aldehydes, carboxylic acids, esters of organic or inorganic acids, ethers, acid amides, and acid anhydrides; nitrogen-containing electron donors such as ammonias, amines, nitriles, and isocyanates; and organic acid halides. Among these electron donors, it is preferable to use one of the inorganic acid esters, organic acid esters, and ethers.

Preferred examples of the inorganic acid esters include silicon compounds represented by $R^2{}_n Si(OR^3)_{4-n}$ where $R^2$ is a hydrocarbon group of 1 to 20 carbons or a hydrogen atom, $R^3$ is a hydrocarbon group of 1 to 20 carbons, and "n" is a number satisfying $0 \le n \le 4$. Specific examples of the silicon compounds include tetraalkoxysilanes such as tetramethoxysilane, tetraethoxysilane, and tetrabutoxysilane; alkyltrialkoxysilanes such as methyltrimethoxysilane, ethyltrimethoxysilane, butyltrimethoxysilane, isobutyltrimethoxysilane, t-butyltrimethoxysilane, methyltriethoxysilane, ethyltriethoxysilane, butyltriethoxysilane, isobutyltriethoxysilane, and t-butyltriethoxysilane; and dialkyldialkoxysilanes such as dimethyldimethoxysilane, diethyldimethoxysilane, dibutyldimethoxysilane, diisobutyldimethoxysilane, di-t-butyldimethoxysilane, butylmethyldimethoxysilane, butylethyldimethoxysilane, t-butylmethyldimethoxysilane, dimethyldiethoxysilane, diethyldiethoxysilane, dibutyldiethoxysilane, diisobutyldiethoxysilane, di-t-butyldiethoxysilane, butylmethyldiethoxysilane, butylethyldiethoxysilane, and t-butylmethyldiethoxysilane.

Preferred examples of the organic acid esters include mono- and poly-carboxylic acid esters, e.g., aliphatic carboxylic acid esters, alicyclic carboxylic acid esters and aromatic carboxylic acid esters. Specific examples of the carboxylic acid esters include methyl acetate, ethyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, diethyl phthalate, di-n-butyl phthalate, and diisobutyl phthalate. Preferred examples of the carboxylic acid esters include unsaturated aliphatic carboxylic acid esters such as methacrylic acid esters, maleic acid ester, and phthalic acid esters, and more preferred examples thereof are phthalic acid diesters.

Examples of the ethers include dialkyl ethers such as diethyl ether, dibutyl ether, diisobutyl ether, diamyl ether, diisoamyl ether, methyl butyl ether, methyl isoamyl ether, and ethyl isobutyl ether. Preferred examples of the ethers include dibutyl ether and diisoamyl ether.

Examples of the organic acid halides include mono- and poly-carboxylic acid halides, e.g., aliphatic carboxylic acid halides, alicyclic carboxylic acid halides, and aromatic carboxylic acid halides. Specific examples of the carboxylic acid halides include acetyl chloride, propionyl chloride, butyryl chloride, valeroyl chloride, acryloyl chloride, methacryloyl chloride, benzoyl chloride, toluoyl chloride, anisoyl chloride, succinyl chloride, malonyl chloride, maleyl chloride, itaconyl chloride, and phthaloyl chloride. Preferred examples thereof include aromatic carboxylic acid chlorides such as benzoyl chloride, toluoyl chloride, and phthaloyl chloride, and a more preferred example thereof is phthaloyl chloride.

Examples of methods for the preparation of the catalyst component (A) include the following methods: (1) a method of reacting a liquid magnesium compound, or a complex compound of a magnesium compound and an electron donor with a precipitating agent, and then treating the reaction product with a titanium compound or with a titanium compound and an electron donor; (2) a method of treating a solid magnesium compound, or a complex compound of a solid magnesium compound and an electron donor with a titanium compound or with a titanium compound and an electron donor; (3) a method of reacting a liquid magnesium compound with a liquid titanium compound in the presence of an electron donor, to precipitate a solid titanium complex; (4) a method of further treating the reaction product obtained in the method (1), (2), or (3), with a titanium compound, or with an electron donor and a titanium compound; (5) a method of treating a solid product which is obtained by reducing an alkoxytitanium compound with an organomagnesium compound such as a Grignard reagent in the presence of an organosilicon compound having a Si—O bond, with an ester compound, an ether compound, and titanium tetrachloride; (6) a method of treating a solid product which is obtained by reducing a titanium compound with an organomagnesium compound, with a mixture of an ether compound and titanium tetrachloride, and then with an organic acid halide compound, in the presence of an organosilicon compound or in the presence of an organosilicon compound and an ester compound, and subsequently treating the resulting solid with a mixture of an ether compound and titanium tetrachloride or with a mixture of an ether compound, titanium tetrachloride, and an ester compound; (7) a method of, after or without treating a contact reaction product of a metal oxide, dihydrocarvyl magnesium, and a halogen-containing alcohol with a halogenating agent, bringing the contact reaction product into contact with an electron donor and a titanium compound; (8) a method of, after or without treating a magnesium compound such as a magnesium salt of an organic acid or an alkoxymagnesium with a halogenating agent, and bringing the magnesium compound into contact with an electron donor and a titanium compound; (9) a method of treating the compound obtained in any one of the methods (1) to (8), with a halogen, a halogen compound, or an aromatic hydrocarbon.

Among the above methods for the preparation of the catalyst component (A), it is preferable to employ one of the methods (1) to (6). All of these preparation methods are generally carried out in an inert gas atmosphere such as nitrogen or argon.

In the preparation of the catalyst component (A), preferably, the titanium compound, the organosilicon compound, and the ester compound are used after dissolved in or diluted with a suitable solvent. Examples of such solvents include aliphatic hydrocarbons such as hexane, heptane, octane, and decane; aromatic hydrocarbons such as toluene and xylene; alicyclic hydrocarbons such as cyclohexane, methylcyclohexane, and decalin; and ether compounds such as diethyl ether, dibutyl ether, diisoamyl ether, and tetrahydrofuran.

In the preparation of the catalyst component (A), the temperature of the reducing reaction with the organomagnesium compound is generally in the range of −50 to +70° C. From the standpoint of catalyst activity and cost, the temperature is preferably in the range of −30 to +50° C. and more preferably in the range of −25 to +35° C. There are no particular restrictions on the dropwise addition time of the organomagnesium compound, but the time is generally in the range of about 30 minutes to about 12 hours. After completion of the reducing reaction, a subsequent reaction may be further carried out at a temperature of 20 to 120° C.

In the preparation of the catalyst component (A), the reducing reaction may be carried out in the presence of a porous material such as an inorganic oxide or an organic polymer so as to allow the solid product to be impregnated into the porous material. Preferred examples of such porous materials are those having the pore volume of at least 0.3 ml/g with the pore radii of 20 to 200 nm and the average particle size of 5 to 300 µm. Examples of the porous inorganic oxides include $SiO_2$, $Al_2O_3$, MgO, $TiO_2$, $ZrO_2$, and multiple oxides thereof. Examples of the porous polymers include polystyrene-based porous polymers such as polystyrene and styrene-divinylbenzene copolymers; polyacrylate ester-based porous polymers such as polyethyl acrylate, methyl acrylate-divinyl benzene copolymers, polymethyl methacrylate, and methyl methacrylate-divinylbenzene copolymers; and polyolefin-based porous polymers such as polyethylene, ethylene-methyl acrylate copolymers, and polypropylene. Among these porous substances, it is preferable to use one of $SiO_2$, $Al_2O_3$, and the styrene-divinylbenzene copolymers.

The organoaluminum compound component used in the preparation of the Ziegler type solid catalyst is one having at least one aluminum-carbon bond in a molecule and typical examples thereof are those represented below.

In the formulas, each of $R^4$ to $R^8$ is a hydrocarbon group of 1 to 8 carbons; Y is a halogen atom, hydrogen, or an alkoxy group; $R^4$ to $R^8$ may be same as or different from each other; "m" is a number satisfying $2 \leq m \leq 3$.

Specific examples of the organoaluminum compound component include trialkylaluminums such as triethylaluminum and triisobutylaluminum; dialkylaluminum hydrides such as diethylaluminum hydride and diisobutylaluminum hydride; dialkylaluminum halides such as diethylaluminum chloride and diisobutylaluminum chloride; mixtures of trialkylaluminum and dialkylaluminum halide, such as a mixture of triethylaluminum and diethylaluminum chloride; and alkylalumoxanes such as tetraethyldialumoxane and tetrabutyldialumoxane. Among these organoaluminum compounds, it is preferable to use one of the trialkylaluminums, the mixtures of trialkylaluminum and dialkylaluminum halide, and the alkylalumoxanes and it is more preferable to use triethylaluminum, triisobutylaluminum, a mixture of triethylaluminum and diethylaluminum chloride, or tetraethyldialumoxane.

Examples of the electron donor component used in the preparation of the Ziegler type solid catalyst include the following commonly-used electron donors: oxygen-containing electron donors such as alcohols, phenols, ketones, aldehydes, carboxylic acids, esters of organic or inorganic acids, ethers, acid amides, and acid anhydrides; and nitrogen-containing electron donors such as ammonias, amines, nitriles, and isocyanates. Among these electron donor components, it is preferable to use one of the inorganic acid esters and the ethers.

Preferred examples of the inorganic acid esters include silicon compounds represented by $R^9_n Si(OR^{10})_{4-n}$ where $R^9$ is a hydrocarbon group of 1 to 20 carbons or a hydrogen atom, $R^{10}$ is a hydrocarbon group of 1 to 20 carbons, and "n" is a number satisfying $0 \leq n \leq 4$. Specific examples thereof include tetrabutoxysilane, butyltrimethoxysilane, tert-butyl-n-propyldimethoxysilane, dicyclopentyldimethoxysilane, and cyclohexylethyldimethoxysilane.

Preferred examples of the ethers include dialkyl ethers, and diether compounds represented below.

In the above formula, each of $R^{11}$ to $R^{14}$ is a linear or branched alkyl, alicyclic hydrocarbon, aryl, or aralkyl group of 1 to 20 carbons, provided that $R^{11}$ or $R^{12}$ may be a hydrogen atom. Specific examples of the ethers include dibutyl ether, diamyl ether, 2,2-diisobutyl-1,3-dimethoxypropane, and 2,2-dicyclopentyl-1,3-dimethoxypropane.

Among these electron donor components, an organosilicon compound represented by $R^{15}R^{16}Si(OR^{17})_2$ is especially preferably used. In this formula, $R^{15}$ is a hydrocarbon group of 3 to 20 carbons in which the carbon atom neighboring the silicon is secondary or tertiary, and specific examples thereof include branched chain alkyl groups such as isopropyl, sec-butyl, tert-butyl, and tert-amyl; cycloalkyl groups such as cyclopentyl and cyclohexyl; cycloalkenyl groups such as cyclopentenyl; and aryl groups such as phenyl and tolyl. In the formula, $R^{16}$ is a hydrocarbon group of 1 to 20 carbons, and specific examples thereof include straight chain alkyl groups such as methyl, ethyl, propyl, butyl, and pentyl; branched alkyl groups such as isopropyl, sec-butyl, tert-butyl, and tert-amyl; cycloalkyl groups such as cyclopentyl and cyclohexyl; cycloalkenyl groups such as cyclopentenyl; and aryl groups such as phenyl and tolyl. In the above formula, $R^{17}$ is a hydrocarbon group of 1 to 20 carbons and is preferably a hydrocarbon group of 1 to 5 carbons. Specific examples of the organosilicon compounds applicable as the electron donor component include tert-butyl-n-propyldimethoxysilane, dicyclopentyldimethoxysilane, and cyclohexylethyldimethoxysilane.

In the preparation of the Ziegler type solid catalyst, an amount of the organoaluminum compound component used is generally in the range of 1 to 1000 moles and preferably in the range of 5 to 800 moles, per mole of titanium atoms in the catalyst component (A). An amount of the electron donor component used is generally in the range of 0.1 to 2000 moles, preferably in the range of 0.3 to 1000 moles, and more preferably in the range of 0.5 to 800 moles, per mole of titanium atoms in the catalyst component (A).

The catalyst component "A", the organoaluminum compound component, and the electron donor component may be brought into contact with each other before supplied to the multistage polymerization reactor, or may be separately supplied to the multistage polymerization reactor, to be brought into contact with each other in the reactor. Alternatively, any two of these components may be first brought into contact with each other, and the remaining component may be then brought into contact with them. The each component may be brought into contact in multiple times.

Examples of the metallocene compounds used in the preparation of the metallocene-type solid catalyst include transition metal compounds represented below.

$L_xM$

In the formula, M is a transition metal, "x" is a number which satisfies the atomic valence of the transition metal M, each L is a ligand coordinated to the transition metal, and at least one of L's is a ligand having a cyclopentadienyl skeleton.

The transition metal M is preferably an atom from Groups 3 to 6 in the Periodic Table of the Elements (IUPAC, 1989), and more preferably titanium, zirconium, or hafnium.

Examples of the ligand L having the cyclopentadienyl skeleton include substituted or unsubstituted cyclopentadienyl groups, substituted or unsubstituted indenyl groups, and substituted or unsubstituted fluorenyl groups and specific examples thereof include cyclopentadienyl, methylcyclopentadienyl, tert-butylcyclopentadienyl, dimethylcyclopentadienyl, tert-butyl-methylcyclopentadienyl, methyl-isopropylcyclopentadienyl, trimethylcyclopentadienyl, tetramethylcyclopentadienyl, pentamethylcyclopentadienyl, indenyl, 4,5,6,7-tetrahydroindenyl, 2-methylindenyl, 3-methylindenyl, 4-methylindenyl, 5-methylindenyl, 6-methylindenyl, 7-methylindenyl, 2-tert-butylindenyl, 3-tert-butylindenyl, 4-tert-butylindenyl, 5-tert-butylindenyl, 6-tert-butylindenyl, 7-tert-butylindenyl, 2,3-dimethylndeyl, 4,7-dimethylindenyl, 2,4,7-trimethylindenyl, 2-methyl-4-isopropylindenyl, 4,5-benzindenyl, 2-methyl-4,5-benzindenyl, 4-phenylindenyl, 2-methyl-5-phenylindenyl, 2-methyl-4-phenylindenyl, 2-methyl-4-naphthylindenyl, fluorenyl, 2,7-dimethylfluorenyl, 2,7-di-tert-butylfluorenyl, and substituted products of these. In cases where there is a plurality of ligands having the cyclopentadienyl skeleton, these ligands may be same as or different from each other.

Examples of the ligands L other than that having the cyclopentadienyl skeleton include heteroatom-containing groups, halogen atoms, and hydrocarbon groups (excluding groups having a cyclopentadiene-type anion skeleton).

Examples of the heteroatom in the heteroatom-containing groups include oxygen, sulfur, nitrogen, and phosphorus atoms, and examples of the groups include alkoxy groups, aryloxy groups, thioalkoxy groups, thioaryloxy groups, alkylamino groups, arylamino groups, alkylphosphino groups, arylphosphino groups, and aromatic or aliphatic heterocyclic groups having at least one atom selected from oxygen, sulfur, nitrogen, and phosphorus atoms, in its ring. Specific examples of the halogen atoms include fluorine, chlorine, bromine, and iodine atoms. Examples of the hydrocarbon groups include alkyl, aralkyl, aryl, and alkenyl groups.

Two or more ligands L may be directly linked to each other or may be linked through a residue containing at least one atom selected from carbon, silicon, nitrogen, oxygen, sulfur, and phosphorus atoms. Examples of the residue include alkylene groups such as methylene, ethylene, and propylene; substituted alkylene groups such as dimethylmethylene (isopropylidene) and diphenylmethylene; silylene groups; substituted silylene groups such as dimethylsilylene, diethylsilylene, diphenylsilylene, tetramethyldisilylene, and dimethoxysilylene; and heteroatoms such as nitrogen, oxygen, sulfur, and phosphorus atoms, and especially preferred examples thereof include methylene, ethylene, dimethylmethylene (isopropylidene), diphenylmethylene, dimethylsilylene, diethylsilylene, diphenylsilylene, and dimethoxysilylene.

Examples of the metallocene compound include bis(cyclopentadienyl)zirconium dichloride, bis(methylcyclopentadienyl)zirconium dichloride, bis(indenyl)zirconium dichloride, bis(4,5,6,7-tetrahydroindenyl)zirconium dichloride, ethylenebis(indenyl)zirconium dichloride, dimethylsilylenebis(trimethylcyclopentadienyl)zirconium dichloride, dimethylsilylenebis(indenyl)zirconium dichloride, and dimethylsilyl(tetramethylcyclopentadienyl) (3,5-di-tert-butyl-2-phenoxy)titanium dichloride. Additional examples include compounds resulting from substitution of dichloride with another group such as dimethoxide or diphenoxide.

Examples of the cocatalyst component used in the preparation of the metallocene-type solid catalyst include organoaluminumoxy compounds, organoaluminum compounds, and boron compounds.

Examples of the organoaluminumoxy compounds include tetramethyldialuminoxane, tetraethyldialuminoxane, tetrabutyldialuminoxane, tetrahexyldialuminoxane, methylaluminoxane, ethylaluminoxane, butylaluminoxane, and hexylaluminoxane.

Examples of the organoaluminum compounds include trimethylaluminum, triethylaluminum, tri-n-butylaluminum, triisobutylaluminum, and tri-n-hexylaluminum.

Examples of the boron compounds include tris(pentafluorophenyl)borane, triphenylcarbenium tetrakis(pentafluorophenyl)borate, tri(n-butyl)ammonium tetrakis(pentafluorophenyl)borate, and N,N-dimethylanilinium tetrakis(pentafluorophenyl)borate.

The granular carrier used in the preparation of the metallocene solid catalyst is preferably a porous substance, and examples thereof include inorganic oxides such as $SiO_2$, $Al_2O_3$, $MgO$, $ZrO_2$, $TiO_2$, $B_2O_3$, $CaO$, $ZnO$, $BaO$, and $ThO_2$; clays or clayey minerals such as smectite, montmorillonite, hectorite, laponite, and saponite; and organic polymers such as polyethylene, polypropylene, and styrene-divinyl benzene copolymers.

The metallocene type solid catalyst applicable herein can be one of those described, for example, in Japanese Patent Application Laid-open Nos. S60-35006, S60-35007, S60-35008, S61-108610, S61-276805, S61-296008, S63-89505, and H3-234709, Published Japanese Translation of PCT Application No. H5-502906, and Japanese Patent Application Laid-open Nos. H6-336502 and H7-224106.

When the metallocene-type solid catalyst is used in olefin polymerization, the cocatalyst component such as an organoaluminum compound or a boron compound may be used in addition if necessary. In that case, the metallocene-type solid catalyst and the cocatalyst component may be brought into contact with each other before supplied to the polymerization reactor, or may be separately supplied to the polymerization reactor to be brought into contact in the reactor. The each component may be brought into contact with each other in multiple times.

The mass mean particle diameter of the above olefin polymerization catalyst is generally in the range of 5 to 150 μm. Particularly, in the gas-phase polymerization reactor, in order to suppress flying-out of particles to the outside of the reactor, it is preferable to use the catalyst having the mass mean particle diameter of at least 10 μm, and it is more preferable to use one having the mass mean particle diameter of at least 15 μm. The polymerization catalyst in the present embodiment may contain an additive such as a fluidization aid or an antistatic additive. The polymerization catalyst in the present embodiment may also be used together with a chain transfer agent such as hydrogen for the purpose of regulating the molecular weight of the polymer.

The olefin polymerization catalyst may be a so-called prepolymerization catalyst preliminarily subjected to polymerization with a small amount of olefin. The olefin used in the prepolymerization can be the olefin used in the above-described polymerization. In this case, a single type of olefin may be used alone, or two or more different types of olefins may be used in combination.

There are no particular restrictions on a method of producing the prepolymerization catalyst, but examples of the method include slurry polymerization and gas-phase polymerization. Among these, the slurry polymerization is preferably applied. It is sometimes economically advantageous in production. The production may be carried out using a batch system, a semibatch system, or a continuous system.

The mass mean particle diameter of the prepolymerization catalyst is generally in the range of 5 to 1000 μm. Particularly, in the gas-phase polymerization reactor, in order to suppress flying-out to the outside of the reactor, it is preferable to use the prepolymerization catalyst having the mass mean particle diameter of at least 10 μm, and it is more preferable to use the prepolymerization catalyst having the mass mean particle diameter of at least 15 μm. Moreover, an amount of the prepolymerization catalyst having particle diameters of not more than 20 μm, especially not more than 10 μm, is preferably as small as possible.

The polymerization catalyst may be introduced in the form of a suspension in a solvent such as a hydrocarbon solvent into the reactor, or may be introduced as entrained on the monomer gas or on an inert gas such as nitrogen.

Next, the process for producing the polyolefin using the system will be described below.

First, in the olefin prepolymerization reactor 5, polyolefin particles containing a catalyst component having polymerization activity are formed using the olefin polymerization catalyst by a well-known method.

On the other hand, the olefin-containing gas is supplied through the line L30 into the cylinder 12A in the olefin polymerization reactor 10A, to raise the interior pressure to the polymerization pressure, and the interior of the cylinder 12A is heated. The polymerization pressure may be any pressure within the range where the olefin can exist in the gas phase in the reactor, is generally in the range of atmospheric pressure to 10 MPaG preferably in the range of 0.2 to 8 MPaG and more preferably in the range of 0.5 to 5 MPaG The polymerization pressure is preferably at least atmospheric pressure because productivity increases; the reaction pressure is preferably not more than 10 MPaG because facility cost of the reactor is not high. The polymerization temperature varies depending upon the type of monomer, the molecular weight of the product, and other factors, but it should be a temperature not higher than the melting point of the olefin polymer, and is preferably at least 10° C. lower than the melting point. Specifically, the temperature is preferably in the range of 0 to 120° C., more preferably in the range of 20 to 100° C., and even more preferably in the range of 40 to 100° C. It is preferable to carry out the polymerization in an environment substantially free of moisture because the polymerization activity is maintained enough. Furthermore, the interior of the polymerization reaction system is preferably kept from including excess oxygen, carbon monoxide or carbon dioxide, in order to avoid reduction of polymerization activity.

Next, polyolefin particles with the particle diameter of about 0.5 mm to about 5.0 mm obtained separately by a well-known method are fed into the cylinder 12A through a feed line L6 connected to the line L5. It is often the case that the polyolefin particles fed into the cylinder 12A are particles with no catalyst component having the polymerization activity, but the polyolefin particles may contain the catalyst component having the polymerization activity.

When the polyolefin particles are fed into the cylinder 12A through the feed line L6 with supply of the olefin-containing gas into the reaction region 25 through the line L30, the spouted bed 8 of polyolefin particles is established in the reaction region 25, as shown in FIG. 1. Specifically, the gas from the gas inlet orifice 30o forms the spouted section 8a near the center axis of the cylinder 12A in the reaction region 25, where the particle concentration is low and where particles flow upward together with the gas, while the gas forms the annular particle layer 8b, where particles fall like a moving bed under the influence of gravity outside the spouted section 8a, so as to induce circulatory movement of particles in the reaction region 25.

After the establishment of the spouted bed 8 in the reaction region 25, the polyolefin particles containing the catalyst component with the polymerization activity, which were formed in the olefin prepolymerization reactor 5, are supplied at a constant rate per unit time through the line L5 into the cylinder 12A, thereby initiating steady operation of the olefin polymerization reactor 10A.

On the other hand, a part of the olefin monomer-containing gas forms the spouted section 8a and flows through the particle layer, while the remainder of the gas diffuses into the annular particle layer 8b. In this way, solid-gas contact is made between the olefin-containing gas and the polyolefin particles including the catalyst component with the polymerization activity and the action of the catalyst within the polyolefin particles promotes the olefin polymerization reaction, to grow the polyolefin particles. The polyolefin particles grown in the reaction region 25 are then discharged through the particle discharge tube 35.

The method according to the present embodiment comprises the step of continuously or intermittently operating the pump 43 to supply liquid olefin from the tank 41 to the liquid olefin reservoir 45, in the production process of polyolefin particles. The liquid olefin evaporates in the liquid olefin reservoir 45, thereby preventing an excessive rise of temperature in the region R. The liquid olefin is preferably the same as the olefin supplied through the line L30. In this case, gas resulting from evaporation of the liquid olefin is guided through the gas inlet orifice 30o into the reaction region 25 to be used as source gas as it is. It is possible to cool the olefin gas discharged through the gas discharge lines L40, into liquid olefin, and to use the liquid olefin again as the liquid olefin for cooling.

A rate of supply of the liquid olefin may be properly regulated according to operation conditions, a kind of olefin, and so on. In an allowable configuration, the amount of gas to be introduced into the reaction region 25 may be regulated in such a manner that a gas discharge port is separately provided in the cylinder 12A or the closer plate 15b defining the lower region 27 and a part of the olefin gas is appropriately discharged through this gas discharge port to the outside.

For establishing the spouted bed 8 in a stable state in the reaction region 25, it is preferable to satisfy the operating conditions below. Namely, the gas superficial velocity $U_o$ is not less than the minimum gas superficial velocity $U_{ms}$ enough to form the spouted bed. This minimum gas superficial velocity $U_{ms}$ is affected by the shape of the polymerization reactor, as well as the physical properties of the powder and gas to be handled. Various estimation formulas have been proposed for calculation of the minimum gas superficial velocity Ums, one example of which is the formula (1) below.

$$Ums = \frac{d_P}{d_B}\left(\frac{d_A}{d_B}\right)^{1/3}\sqrt{\frac{2gL_S(\rho_S-\rho_G)}{\rho_G}} \times \left(\frac{\rho_G}{\rho_{AIR}}\right)^{0.2} \quad (1)$$

In the formula, $d_P$ is the particle diameter, $\rho_S$ the particle density, $\rho_G$ the gas density under the pressure and temperature conditions of the reaction region, $\rho_{AIR}$ the density of air under room temperature conditions, and $L_S$ the height of the spouted bed.

The spouted bed height $L_S$ in the reaction region 25 is not more than the maximum spouted bed height $Ls_{MAX}$ m enough to establish the spouted bed, and those are no particular restrictions thereon as long as it is not more than the maximum spouted bed height $Ls_{MAX}$. Various estimation formulas have been proposed for calculation of the maximum spouted bed height $Ls_{MAX}$, an example of which is the formula (2) below.

$$\frac{Ls_{MAX}}{d_B} = \frac{d_B}{d_A}\left\{0.218 + \frac{0.005(\rho_S-\rho_G)gd_A}{\rho_G u_t u_{mf}}\right\} \quad (2)$$

In the formula, $u_t$ is the terminal velocity of the particles, and $u_{mf}$ the minimum fluidization velocity.

From the standpoint of volume efficiency and establishment of the spouted bed in a stabler state, the spouted bed height $L_S$ is preferably higher than the height of the tubular baffle 30.

The olefin polymerization reactor 10A according to the present embodiment achieves the effects described below. Specifically, the liquid olefin supplied from the outside evaporates on the outer surface 30b of the tubular baffle 30 to efficiently cool the tubular baffle 30, thus achieving a sufficiently high heat removal efficiency. A temperature rise is suppressed at the tubular baffle 30, whereby excessive progress of polymerization reaction is adequately prevented even with a low transfer rate of polyolefin particles moving in the region R, so as to improve the homogeneity of resulting polyolefin particles and adequately suppress the trouble such as adhesion of polyolefin to the inner surface 30a of the tubular baffle 30.

Second Embodiment

Figure 2:
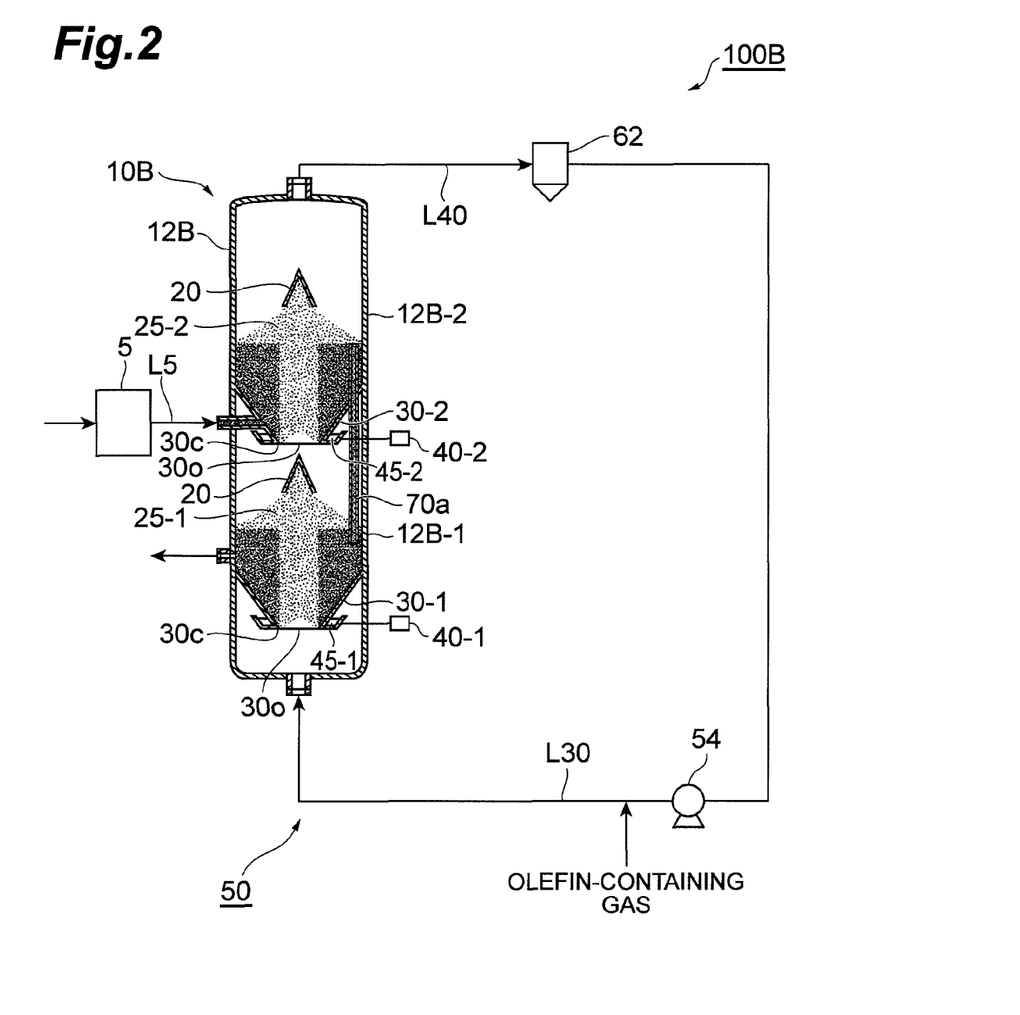
FIG. 2 is a schematic configuration diagram showing another embodiment of the olefin polymerization reactor according to the present invention.

A polyolefin production system 100B shown in FIG. 2 is provided with the olefin prepolymerization reactor 5 and a spouted-bed-type olefin polymerization reactor 10B having two stages of reaction regions 25 in the vertical direction. The number of stages of reaction regions 25 is not limited to two, but may be three or more. The second embodiment will be described below mainly as to differences from the first embodiment, and the description and illustration will be suitably omitted for the configurations common to those in the first embodiment (e.g., the liquid olefin supplying device 40).

As shown in FIG. 2, the olefin polymerization reactor 10B has the two reaction regions 25 in a cylinder 12B and spouted beds 8 are formed in the respective reaction regions 25 by the gas supplied from bottom. On the other hand, polyolefin particles successively pass through the two reaction regions 25 so as to be transferred from the upper reaction region 25 to the lower reaction region 25.

Specifically, the cylinder 12B has a first cylinder 12B-1 on the upper side and a second cylinder 12B-2 on the lower side. A first tubular baffle (first tapered cylindrical member) 30-1 is placed in the first cylinder 12B-1 and a second tubular baffle (second tapered cylindrical member) 30-2 is placed in the second cylinder 12B-2. Furthermore, the system 100B has a liquid supplying device (first liquid supplying part) 40-1 to supply a liquid (preferably, liquid olefin) so that the liquid may come into contact with the outer surface of the first tubular baffle 30-1, and a liquid supplying device (second liquid supplying part) 40-2 to supply a liquid (preferably, liquid olefin) so that the liquid may come into contact with the outer surface of the second tubular baffle 30-2.

The first reaction region 25-1 is a portion surrounded by the inner surface of the first tubular baffle 30-1 and the inner surface of the first cylinder 12A-1 above the first tubular baffle 30-1, and the second reaction region 25-2 is a portion surrounded by the inner surface of the second tubular baffle 30-2 and the inner surface of the second cylinder 12A-2 above the second tubular baffle 30-2.

The gas supplying part 50 supplies an olefin-containing gas through the gas inlet orifice 30o of the first tubular baffle 30-1 into the first reaction region 25-1, to form the spouted bed in the first reaction region 25-1.

The system 100B has an interconnection structure in which the gas discharged from the first cylinder 12B-1 is supplied through the gas inlet orifice 30o of the second tubular baffle 30-2 into the second reaction region 25-2. Specifically, in the present embodiment, the top end of the first cylinder 12B-1 is interconnected with the bottom end of the second cylinder 12B-2, and the first cylinder 12B-1 and the second cylinder 12B-2 constitute one vertical cylinder 12B. It is also possible to implement an interconnection structure in which the top end of the first cylinder 12A-1 is not connected directly to the bottom end of the second cylinder 12A-2 and they are interconnected with each other through a pipe thinner than these cylinders.

The configurations of the cylinders 12B-1, 12B-2, the tubular baffles 30-1, 30-2, and the liquid supplying devices 40-1, 40-2 which are not described in particular in the present embodiment are the same as those of the cylinder 12A, the tubular baffle 30, and the liquid supplying device 40, respectively, in the first embodiment.

The olefin polymerization reactor 10B has a downcomer pipe 70a provided so as to penetrate the upper tubular baffle 30-2, as a transfer device for transferring polyolefin particles from the second reaction region 25-2 located downstream with respect to the gas flow direction, into the first reaction region 25-1 located upstream with respect to the gas flow direction. The downcomer pipe 70a lets down the polyolefin particles from the upper reaction region 25 to the lower reaction region 25.

The transfer device of polyolefin particles does not always have to be limited to the downcomer 70a, but may be one employing an ejector method. The transfer device 70 shown in FIG. 3 has a particle extraction line L31 to extract the polyolefin particles from the upper reaction region 25, an ejector 32 disposed at the leading end of this particle extraction line L31, and a particle supply line L33 to supply the polyolefin particles from the ejector 32 to the lower reaction region 25. An on-off valve 80 is provided in the middle of the particle extraction line L31. Lines L38 are connected each to the particle extraction line L31 on the upstream side and on the downstream side, respectively, of the on-off valve 80, so that gas for prevention of clogging can be supplied through the lines L38 into the particle extraction line L31.

Figure 3:
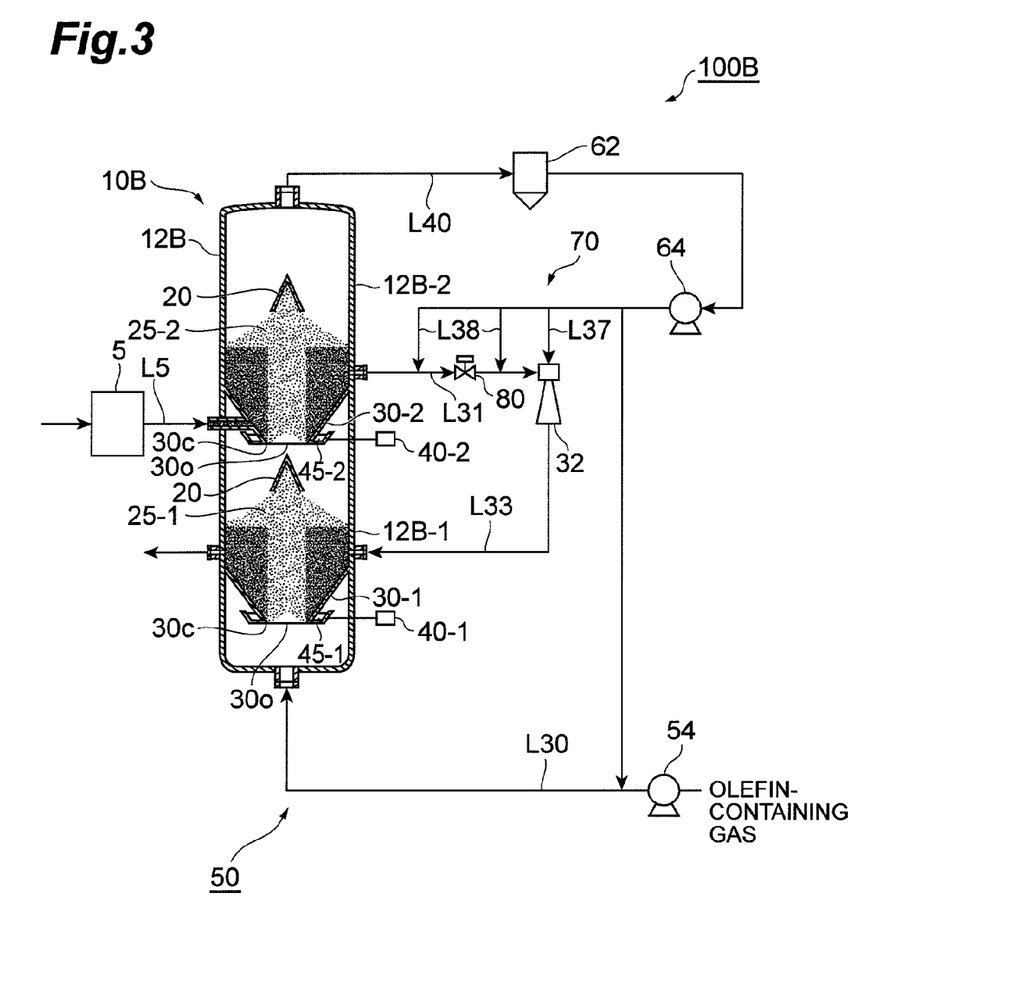
FIG. 3 is a schematic configuration diagram showing an olefin polymerization reactor with a transfer device having an ejector.

Part of gas whose pressure is raised by a compressor 64 is supplied through a line L37 to the ejector 32. This gas is used as gas for actuation of the ejector. Part of the gas whose pressure is raised by the compressor 64 is supplied through the lines L38 into the particle extraction line L31 on the upstream side and the downstream side of the on-off valve 80. This gas is used as gas for prevention of clogging of the on-off valve 80 and the ejector 32.

There are no particular restrictions on a flow rate of the gas for actuation of the ejector as long as it is enough for discharge of polyolefin particles. On the other hand, the gas for prevention of clogging is preferably approximately 10 parts by volume to 100 parts by volume of the gas for actuation of the ejector. From the viewpoint of securely preventing the clogging of the on-off valve 80 and the ejector 32, it is preferable to constantly supply the gas through the lines L38 to the upstream side and the downstream side of the on-off valve 80, regardless of whether the on-off valve 80 is opened or closed, during the operation of the olefin polymerization reactor 10B.

Another mode except for the above-described transfer devices of polyolefin particles is, for example, one having a valve called an L-valve, outside the cylinder 12B. The "L-valve" stated herein has a vertical pipe portion with a seal function (material seal function by particles) capable of preventing inflow of gas from bottom in a filled state with particles, and a horizontal pipe portion to supply polyolefin particles to the lower reaction region. Besides the L-valve, there are also valves with the same seal function and particle transfer function by gas, e.g., valves called N-valve and J-valve named after their shape. Among these valves, the L-valve is preferably applicable in terms of the following aspect. Namely, since the L-valve has small curvature of path and simple structure, it is superior in suppression of retention of polyolefin particles, transferability thereof, and maintenance. When this L-valve is used, the transfer device can be constructed in a configuration having the L-valve, and a slanted pipe connected to the top end of the vertical pipe portion of the L-valve and configured to extract the polyolefin particles from the upper reaction region to the outside of the cylinder.

Figure 4:
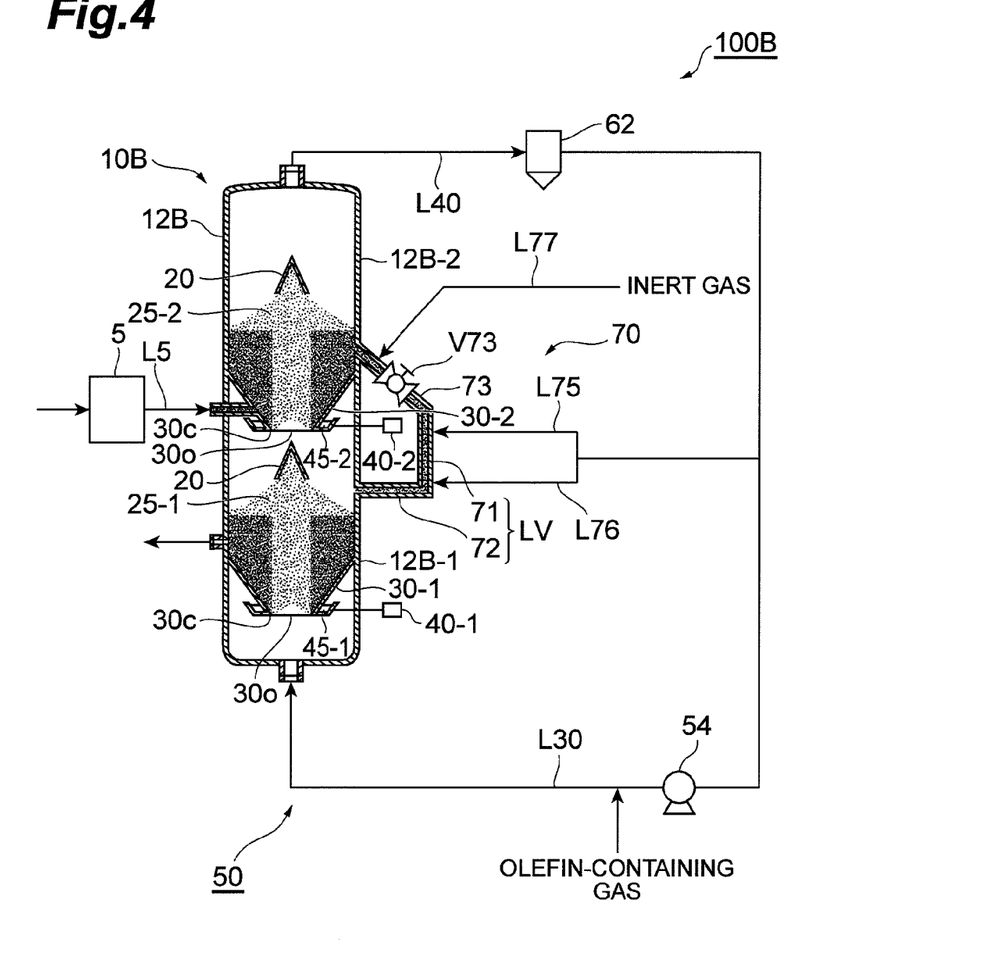
FIG. 4 is a schematic configuration diagram showing an olefin polymerization reactor with a transfer device having an L-valve.

More specifically, the transfer device 70 shown in FIG. 4 has a vertical pipe portion 71 with the seal function capable of suppressing inflow of gas from the lower reaction region 25 in a state in which it is filled with polyolefin particles, a horizontal pipe portion 72 to supply the polyolefin particles into the lower reaction region 25, and a slanted pipe 73 connected to the top end of the vertical pipe portion 71 and configured to extract the polyolefin particles from the upper reaction region 25 to the outside of the cylinder 12B. The L-valve LV is composed of the vertical pipe portion 71 and the horizontal pipe portion 72. This transfer device has the advantages of excellent transferability of polyolefin particles and easy maintenance. For example, Published Japanese Translation of PCT Application No. 2002-520426 and Japanese Patent No. 4076460 include the description about the L-valve.

With the L-valve LV, a part of the circulating gas is supplied as driving gas through a line L75 connected to the middle of the vertical pipe portion 71, to move particles in the vertical pipe portion 71 and the horizontal pipe portion 72, whereby the polyolefin particles can be transferred from the upper reaction region 25 to the lower reaction region 25. Together with the line L75 connected to the middle of the vertical pipe portion 71 or instead of the line L75, as shown in FIG. 4, a line L76 may be connected to the valve so as to supply the driving gas in the horizontal direction from a connection part between the vertical pipe portion 71 and the horizontal pipe portion 72.

For adjusting residence times and/or holdups in the respective reaction regions 25 of the olefin polymerization reactor 10B, there are cases where the transfer of polyolefin particles from top to bottom is temporarily suspended. For this purpose, it is preferable to locate a valve V73 in the middle of the slanted pipe 73. Furthermore, it is preferable to adopt a configuration wherein cooling gas can be supplied through a line L77 into the pipe 73, in order to prevent progress of polymerization reaction of polyolefin particles filled above the valve V73 in the slanted pipe 73 in closed periods of the valve V73. There are no particular restrictions on the cooling gas as long as it causes no adverse effect on polymerization activity of polymer particles; however, it is preferable to use an inert gas or an olefin gas of the same composition as that in the polymerization reaction system. The inert gas is very effective because it can completely suppress the progress of polymerization of olefin polymer particles, though temporarily, and, thereafter, the progress of polymerization can be restarted by transfer of particles to under an olefin gas atmosphere. However, an amount of the inert gas used is limited within the range where it causes no significant effect on the composition in the polymerization reaction system.

The present invention is not limited to the above embodiments but a variety of modifications can be contemplated.

In the systems of FIGS. 2 to 4, the second cylinder 12B-2 and the second tubular baffle 30-2 are arranged above the first cylinder 12B-1 and the first tubular baffle 30-1, but they may be arranged beside the first cylinder 12B-1 and the first tubular baffle 30-1. The present invention can also be carried out in a configuration wherein the second cylinder 12B-2 and the second tubular baffle 30-2 are arranged below the first cylinder 12B-1 and the first tubular baffle 30-1.

Furthermore, the configuration of the gas supplying part 50 is not limited to the configurations of FIGS. 1 to 4, either. For example, the line L30 may be connected directly to the bottom end 30c of the tubular baffle 30, instead of the closer plate 15b.

The inventors conducted research on influence of the L-valve on transferability of powder and establishment of the spouted beds, using a cold model apparatus of the configuration shown in FIG. 4. The cylindrical cold model apparatus for formation of spouted beds is made of transparent polyvinyl chloride to allow observation of an internal state from the outside, and this apparatus is configured to form two stages of spouted beds in the cylinder in such a manner that two sets of combinations each of which consists of a tubular baffle of an inverted cone shape with a gas inlet orifice and a deflector of a conical shape are arranged in the vertical direction and in a coaxial state.

The inner diameter $d_B$ of the cylindrical cold apparatus is 500 mm and the opening diameter $d_A$ of the gas inlet orifice at the bottom end of the tubular baffle 75 mm. In this test, therefore, a ratio ($d_A/d_B$) of the opening diameter $d_A$ of the gas inlet orifice to the inner diameter $d_B$ of the cylinder is 0.15.

An angle of inclination between the inner surface of each tubular baffle of the inverted cone shape and a horizontal plane and an angle of inclination between the outer surface of each deflector and a horizontal plane both are 65°. Each of the deflectors of the conical shape has the outer diameter of 300 mm at the bottom end thereof and the interior thereof is hollow.

The cold model apparatus has a device for transferring powder from the upper reaction region to the lower reaction region. This device is composed of a slanted pipe to extract the polyolefin particles from the upper reaction region, a vertical pipe portion with the material seal function by particles capable of suppressing inflow of gas from bottom, a horizontal pipe portion to supply the polyolefin particles to the lower reaction region, and a gas supply pipe to supply gas to the vertical pipe portion and the horizontal pipe portion for discharge and driving of particles. The inner diameters of the slanted pipe, the vertical pipe portion, and the horizontal pipe portion all are 40 mm.

The gas for formation of the spouted beds to be introduced to the main body of the apparatus was air at room temperature, which was supplied at 6 m³ per minute. The particles used were polypropylene particles with the average particle size of 1000 µm. Each of the upper-stage and the lower-stage reaction regions was charged with 30 kg of polypropylene particles and the gas was supplied at the foregoing flow rate through the gas inlet orifice of the lower tubular baffle, thereby forming the spouted beds in the two reaction regions.

Thereafter, 10 kg of polypropylene particles with the same average particle size were supplied to the upper region only and the powder driving gas was supplied at 100 l/min to transfer the powder from the upper spouted bed region to the lower spouted bed region. A time necessary for the transfer of 10 kg of polypropylene particles was measured to determine a transfer rate. Transfer rates were also determined in the same manner as above, except that the rate of powder driving gas was changed to 150 l/min or 200 l/min. The results are provided in Table 1 below.

TABLE 1

| Rate of driving gas | Transfer rate of particles |
|---|---|
| 100 l/min | 2.6 kg/min |
| 150 l/min | 4.2 kg/min |
| 200 l/min | 4.8 kg/min |

The polypropylene particles (average particle size: 1000 µm) used in the present test are classified into Group B particles in the Geldart's classification of particle fluidization characteristics, which are easy to be fluidized, but it was confirmed that the spouted beds were stably formed even with such particles and the powder could be stably transferred without back mixing of particles.

LIST OF REFERENCE SIGNS 5 olefin prepolymerization reactor; 8 spouted bed; 10A, 10B olefin polymerization reactors; 12A, 12B cylinders (cylinder sections); 25 reaction region; 30 tubular baffle (tapered cylindrical member); 30a inner surface of tapered cylindrical member; 30b outer surface of tapered cylindrical member; 30c bottom end of tapered cylindrical member (gas inlet orifice); 32 ejector; 40 liquid olefin supplying device; 41 tank; 43 pump; 45 liquid olefin reservoir; L42 transfer line; 50 gas supplying part; LV L-valve; 70 transfer device; 70a downcomer; 71 vertical pipe portion; 72 horizontal pipe portion; 73 slanted pipe; 100A, 100B polyolefin production systems.

What is claimed is:

1. A polyolefin production process for performing polymerization of olefin using the olefin polymerization reactor comprising:
    a first cylinder which extends vertically; a first tapered cylindrical member which is placed in the first cylinder, which decreases in inner diameter progressively downward, and which has a gas inlet orifice at a bottom end thereof;
    a first liquid supplying part which supplies a liquid so that the liquid may come into contact with an outer surface of the first tapered cylindrical member; and
    a gas supplying part which supplies an olefin-containing gas through the gas inlet orifice into a first reaction region surrounded by an inner surface of the first tapered cylindrical member and an inner surface of the first cylinder above the first tapered cylindrical member, to form a spouted bed in the first reaction region, wherein the process comprising:
    a step of forming a spouted bed of polyolefin particles in the first reaction region; and
    a step of supplying a liquid so that the liquid may come into contact with the outer surface of the first tapered cylindrical member.

2. The process according to claim 1, wherein polymerization of olefin is performed using a plurality of the olefin polymerization reactor as set forth in claim 1.

3. A polyolefin production process, in which multistage polymerization of olefin is performed by using the polyolefin production system comprising:

an olefin prereaction reactor which performs polymerization of olefin in the presence of an olefin polymerization catalyst to form polyolefin particles; and an olefin polymerization reactor comprises:

a first cylinder which extends vertically; a first tapered cylindrical member which is placed in the first cylinder, which decreases in inner diameter progressively downward, and which has a gas inlet orifice at a bottom end thereof;

a first liquid supplying part which supplies a liquid so that the liquid may come into contact with an outer surface of the first tapered cylindrical member; and a gas supplying part which supplies an olefin-containing gas through the gas inlet orifice into a first reaction region surrounded by an inner surface of the first tapered cylindrical member and an inner surface of the first cylinder above the first tapered cylindrical member, to form a spouted bed in the first reaction region, which is connected to the olefin prereaction reactor.

* * * * *